F. SHALLER.
Watchmaker's Lathe.
No. 67,810.
Patented Aug. 13, 1867.
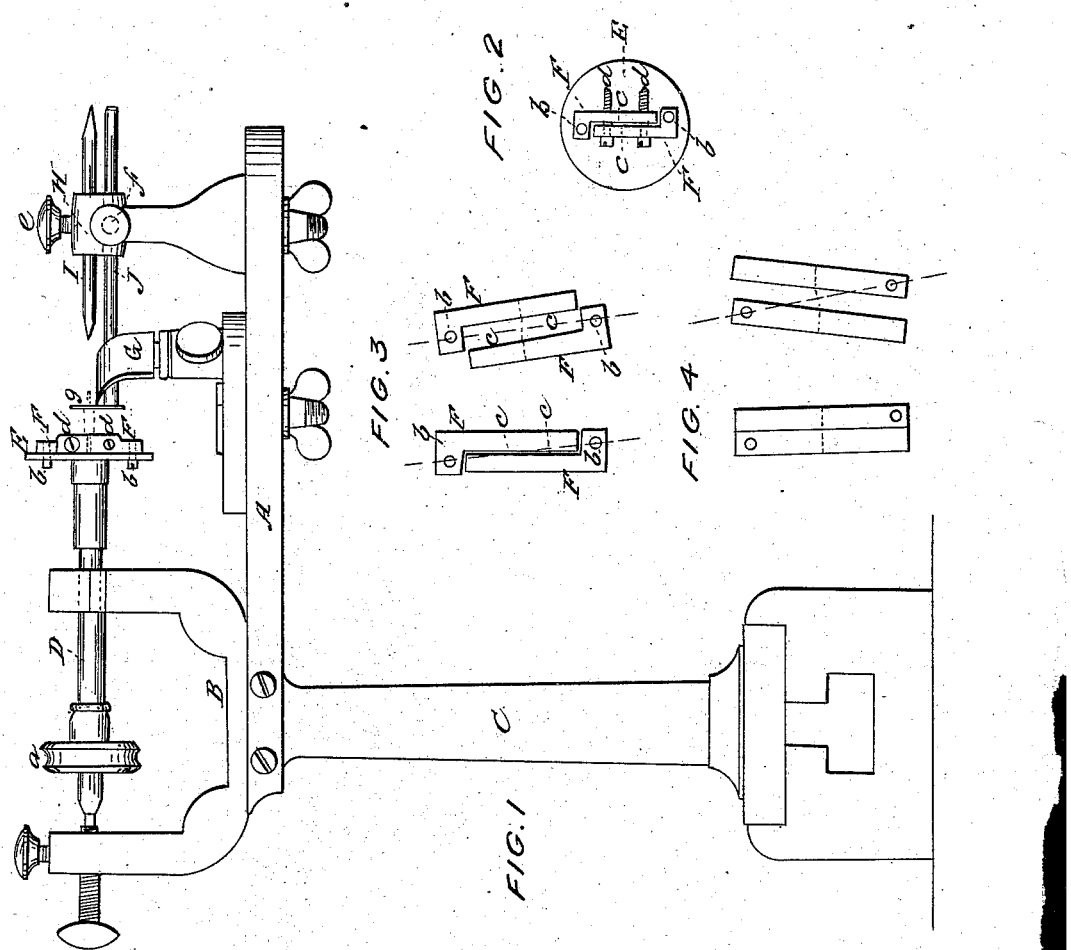

United States Patent Office.

FREDERICK SHALLER, OF HUDSON, NEW YORK.

Letters Patent No. 67,810, dated August 13, 1867.

---

IMPROVEMENT IN TURNING-LATHES.

---

The Schedule referred to in these Letters Patent and making part of the same.

---

TO ALL WHOM IT MAY CONCERN:

Be it known that I, FREDERICK SHALLER, of Hudson, in the county of Columbia, and State of New York, have invented a new and useful Improvement in Lathes for Watchmakers' Use, and other purposes, of which the following is a full, clear, and exact description, reference being had to the accompanying drawing, forming part of this specification, and in which—

Figure 1 represents a side elevation of a lathe constructed as for watchmakers' use, with my improvement applied to it.

Figure 2, a face view of my improved chuck detached, and

Figures 3 and 4 diagrams in illustration of the action of the same.

Similar letters of reference indicate corresponding parts.

The nature of my invention consists, firstly, in a novel construction of chuck, applicable to watchmakers and other lathes, by a peculiar attachment to or connection therewith of a clamp or dogs for holding the work under operation, and whereby the grip of the same is made secure, with a fixed or true position of or for its centre under varying sizes or diameters; and my invention further consists in a combination, with a lathe puppet, of an adjustable gauge and reversible male and female centring-pin.

Referring to the accompanying drawing, A represents the bed of the lathe, carrying at one end the headstock B, shown as formed by branches extending from and made in one piece with the standard C, which should be adjustable, by a screw-knob and nut, in or along a slotted bed below, suitably connected with the bench. D is the mandrel driven by a pulley, $a$, and carrying the chuck E, which may be so fitted to the mandrel as to be removable therefrom at pleasure, and other chucks of like or different construction substituted therefor. This chuck E has pivoted to or on its face dogs or bars F F, forming a clamp for holding the work, said bars being separately pivoted thereto, by pins $b\ b$, on opposite sides of the lathe's centre, at equal distances therefrom, and at points which lie inside of their griping edges $c\ c$, and so that a line drawn to intersect said pivots will lie parallel to the griping edges when they are parallel to each other. By this lateral arrangement of the pivots $b\ b$, relatively, the clamping faces of the bars, as clearly represented in figs. 2 and 3, not only may the bars F F have the clamping edges adjusted parallel to each other to hold the work, but, however varied the size or diameter of work they hold, a line drawn at right angles from the one griping-edge to the other will intersect a common centre, which is that of the mandrel. This insures truth in centring without trouble of adjustment, and avoids all slipping of the working between or out of the bars, thereby perfecting the grip. Were the bars pivoted, as represented in fig. 4, such would not be the case, as, in such arrangement, a line drawn to intersect the pivots does not lie parallel to the griping-edges, nor, excepting when the bars are closed one against the other, would a line drawn at right angles from the one griping-edge intersect the common centre of the lathe, consequently rendering difficult both the centring and holding of the work against slipping. The difference thus described between these two arrangements of the bars is clearly exhibited by black and red lines in the diagrams, figs. 3 and 4. Screws $d\ d$ may be used to tighten up the clamping-bars F F to their grip on the work. This form of chuck may be used not only for watchmakers or jewellers, but for heavy or machine work as well. By it much time will be economized in centring.

G is the lathe-rest and H its puppet, which is provided with a reversible and longitudinally-sliding or adjustable centring-rod, I, the same having a female centre at one end and male centre at the other, to suit different kinds of work, and being held to its place when adjusted by a set-screw, $e$. Said puppet is also provided with a longitudinally-sliding rod, J, held by a set-screw, $f$, and having at its inner end a slotted gauge and tool-guide, $g$, to facilitate the workman in turning the work to a given length, as, for instance, the spindle of a watch-pinion, represented by red lines in fig. 1. For delicate work, this gauge and the reversible male and female centring-pin in the one puppet will be found very convenient, and save much time and labor. The turning of the work to a fixed gauge, acting as a guide to the tool, as is the case here, not merely expedites performance of the work and insures accuracy, but also avoids much stooping and straining of the eyes.

What I here claim, and desire to secure by Letters Patent, is—

1. The chuck E, with its clamping-bars F F, pivoted and arranged for operation substantially as described.

2. The combination, with the puppet H, of the gauge-bar J, with its tool-guide and gauge $g$, and reversible male and female centring-rod I, essentially as specified.

FREDERICK SHALLER.

Witnesses:
 JNO. B. LONGLEY,
 WHEELER H. CLARKE.